(12) United States Patent
Zhang et al.

(10) Patent No.: US 11,349,126 B2
(45) Date of Patent: *May 31, 2022

(54) POSITIVE ELECTRODE PLATE, ELECTROCHEMICAL DEVICE AND SAFETY COATING

(71) Applicant: Contemporary Amperex Technology Co., Limited, Ningde (CN)

(72) Inventors: Xiaowen Zhang, Ningde (CN); Haizu Jin, Ningde (CN); Xing Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 174 days.

This patent is subject to a terminal disclaimer.

(21) Appl. No.: 16/762,507

(22) PCT Filed: Nov. 7, 2018

(86) PCT No.: PCT/CN2018/114298
§ 371 (c)(1),
(2) Date: May 8, 2020

(87) PCT Pub. No.: WO2019/091392
PCT Pub. Date: May 16, 2019

(65) Prior Publication Data
US 2021/0184220 A1    Jun. 17, 2021

(30) Foreign Application Priority Data
Nov. 8, 2017    (CN) .......................... 201711091425.8

(51) Int. Cl.
*H01M 4/66*    (2006.01)
*C09D 127/08*    (2006.01)
*C09D 127/16*    (2006.01)
*H01M 4/13*    (2010.01)
(Continued)

(52) U.S. Cl.
CPC .......... *H01M 4/667* (2013.01); *C09D 127/08* (2013.01); *C09D 127/16* (2013.01); *H01M 4/13* (2013.01);
(Continued)

(58) Field of Classification Search
CPC .............. C09D 127/08; C09D 127/16; H01M 10/0525; H01M 10/42; H01M 10/4235;
(Continued)

(56) References Cited

U.S. PATENT DOCUMENTS

2005/0079422 A1    4/2005    Ko et al.
2011/0111302 A1    5/2011    Sato et al.
(Continued)

FOREIGN PATENT DOCUMENTS

CN    1585157 A    2/2005
CN    101471435 A    7/2009
(Continued)

OTHER PUBLICATIONS

The Third Office Action for China Application No. 201711091425.8, dated Sep. 14, 2020, 6 pages.
(Continued)

*Primary Examiner* — Victoria H Lynch
(74) *Attorney, Agent, or Firm* — Law Offices of Liaoteng Wang

(57) ABSTRACT

The present application relates to a positive electrode plate, an electrochemical device and a safety coating. The positive electrode plate comprises a current collector, a positive active material layer and a safety coating disposed between the current collector and the positive active material layer, the safety coating comprising a fluorinated polyolefin and/or chlorinated polyolefin polymer matrix, a conductive material and an inorganic filler. The positive electrode plate can quickly disconnect circuit when the electrochemical device (Continued)

(such as a capacitor, primary battery, or secondary battery, and the like) is in a high temperature condition or an internal short circuit occurs, thereby improving high temperature safety performance of the electrochemical device.

17 Claims, 1 Drawing Sheet

(51) Int. Cl.
  *H01M 4/62* (2006.01)
  *H01M 10/0525* (2010.01)
  *H01M 10/42* (2006.01)
  *H01M 4/02* (2006.01)
(52) U.S. Cl.
  CPC ........... *H01M 4/625* (2013.01); *H01M 4/626* (2013.01); *H01M 4/668* (2013.01); *H01M 10/0525* (2013.01); *H01M 10/4235* (2013.01); *H01M 2004/028* (2013.01); *H01M 2200/106* (2013.01)
(58) Field of Classification Search
  CPC ..... H01M 2004/028; H01M 2200/106; H01M 4/06; H01M 4/13; H01M 4/625; H01M 4/626; H01M 4/66; H01M 4/667; H01M 4/668; Y02E 60/10
  See application file for complete search history.

(56) References Cited

U.S. PATENT DOCUMENTS

| | | | |
|---|---|---|---|
| 2012/0237824 A1 | 9/2012 | Koh et al. | |
| 2017/0092943 A1* | 3/2017 | Li | H01M 4/139 |
| 2020/0136127 A1* | 4/2020 | Cho | H01M 4/364 |

FOREIGN PATENT DOCUMENTS

| | | | | |
|---|---|---|---|---|
| CN | 102035039 A | | 4/2011 | |
| CN | 102176360 A | | 9/2011 | |
| CN | 102646811 A | | 8/2012 | |
| CN | 203218375 U | | 9/2013 | |
| CN | 103904294 A | | 7/2014 | |
| CN | 103956499 A | | 7/2014 | |
| CN | 104409681 A | | 3/2015 | |
| CN | 104823313 A | | 8/2015 | |
| CN | 105098193 A | * | 11/2015 | ............ H01M 4/366 |
| CN | 105470523 A | | 4/2016 | |
| CN | 105594019 A | | 5/2016 | |
| CN | 106558676 A | | 4/2017 | |
| CN | 106898730 A | | 6/2017 | |
| CN | 106910897 A | | 6/2017 | |
| CN | 106981664 A | | 7/2017 | |
| EP | 3483900 A1 | | 5/2019 | |
| WO | 2020098769 A1 | | 5/2020 | |
| WO | 2020098792 A1 | | 5/2020 | |

OTHER PUBLICATIONS

The extended European search report for EP Application No. 18875836.1, dated Nov. 11, 2020, 8 pages.
The First Office Action for Chinese Application No. 201711091425.8, dated Apr. 14, 2020, 10 pages.
The Second Office Action for Chinese Application No. 201711091425.8, dated Jul. 14, 2020, 9 pages.
The International Search Report for PCT/CN2018/114298, dated Feb. 1, 2019, 11 pages.

* cited by examiner

POSITIVE ELECTRODE PLATE, ELECTROCHEMICAL DEVICE AND SAFETY COATING

CROSS-REFERENCE TO RELATED APPLICATION

This application is a National Stage of International Application No. PCT/CN2018/114298, filed on Nov. 7, 2018, which claims priority to Chinese Patent Application No. 201711091425.8 filed on Nov. 8, 2017, both of which are incorporated herein by reference in its entirety.

TECHNICAL FIELD

The present application relates to the field of electrochemical technology, and more particularly, to a positive electrode plate and an electrochemical device containing the positive electrode plate.

BACKGROUND

Lithium-ion batteries are widely used in electric vehicles and consumer electronics because of their high energy density, high output power, long cycle life and small environmental pollution. However, lithium-ion batteries are prone to fire and explosion when subjected to abnormal conditions such as crushing, bumping or puncturing, causing serious harm. Therefore, the safety problem of lithium-ion batteries greatly limits the application and popularity of lithium-ion batteries.

A large number of experimental results show that internal short circuit of battery is the basic cause of the lithium-ion battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become larger, and even making the conductive path of the entire electrode active material layer to be destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material of the PTC layer and thus the dissolved PTC material enters the upper active material layer, which would not only destroy the PCT effect of the PTC layer and also deteriorate its electrical properties. In addition, in the compacting step of the plate fabrication process, the PTC material layer is easily squeezed to the edge and thus the electrode active material layer would directly contact the current collector, so that the PTC material layer cannot improve the safety performance. In addition, it is required to greatly improve the performance of the PTC material layer, such as the response speed, the effect of blocking current, and the like.

In view of this, it is indeed necessary to provide an electrode plate and a battery having improved a safety performance and a battery performance (such as a cycle performance), which are capable of solving the above problems.

SUMMARY

An object of the present application is to provide a positive electrode plate and an electrochemical device with improved safety and electrical performances (such as cycle performance).

Another object of the present application is to provide a positive electrode plate and an electrochemical device with improved safety and electrical performances (such as cycle performance) both.

A further object of the present application is to provide an electrode plate and an electrochemical device with good safety performance, improved electrical performance (such as cycle performance), easy processing and the like, which are suitable for large-scale production and application.

The present application provides a positive electrode plate comprising a current collector, a positive active material layer and a safety coating disposed between the current collector and the positive active material layer, the safety coating comprises a polymer matrix, a conductive material and an inorganic filler and the polymer matrix is a fluorinated polyolefin and/or chlorinated polyolefin polymer matrix and based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %. Preferably, the inorganic filler is a carbon coating modified positive electrochemically active material.

The present application also provides an electrochemical device comprising the positive electrode plate of the present application, which is preferably a capacitor, a primary battery or a secondary battery.

The present application also provides a safety coating for an positive electrode plate, comprising a polymer matrix, a conductive material and an inorganic filler and the polymer matrix is a fluorinated polyolefin and/or chlorinated polyolefin polymer matrix and based on the total weight of the safety coating, the weight percentage of the polymer matrix is from 35 wt % to 75 wt %, preferably from 50 wt % to 75 wt %; the weight percentage of the conductive material is from 5 wt % to 25 wt %, preferably from 5 wt % to 15 wt %; and the weight percentage of the inorganic filler is from 10 wt % to 60 wt %, preferably from 15 wt % to 45 wt %.

Preferably, the inorganic filler is a carbon coating modified positive electrochemically active material.

DESCRIPTION OF THE DRAWINGS

The positive electrode plate, the electrochemical device and the beneficial effects of the present application will be described in detail below with reference to the accompanying drawings and specific embodiments.

FIG. 1 is a schematic structural view of a positive electrode plate according to an embodiment of the present application, in which 10—a current collector; 14—a positive active material layer; 12—a safety coating (i.e., PTC safety coating).

DETAILED DESCRIPTION

The present application discloses a positive electrode plate comprising a current collector, a positive active material layer and a safety coating disposed between the current collector and the positive active material layer, the safety coating comprises a fluorinated polyolefin and/or chlorinated polyolefin polymer matrix, a conductive material and an inorganic filler.

FIG. 1 is a schematic structural view of a positive electrode plate according to some embodiments of the present application, in which 10—a current collector; 14—a positive active material layer; 12—a safety coating (i.e., PTC safety coating).

It would be easy to understand that although the PTC safety coating 12 and the positive active material layer 14 are provided only on one side of the positive current collector 10 as shown in FIG. 1, in other embodiments, the PTC safety coating 12 and the positive active material layer 14 may be provided on both sides of the positive current collector 10.

In the present application, fluorinated polyolefin and/or chlorinated polyolefin as the polymer matrix of the safety coating refers to polyvinylidene fluoride (PVDF), polyvinylidene chloride (PVDC), modified PVDF, or modified PVDC. For example, fluorinated polyolefin and/or chlorinated polyolefin may be selected from the group consisting of PVDF, carboxylic acid modified PVDF, acrylic acid modified PVDF, PVDF copolymer, PVDC, carboxylic acid modified PVDC, acrylic acid modified PVDC, PVDC copolymer or any mixture thereof.

In the conventional coating having PTC effect for use in batteries, polyethylene, polypropylene or ethylene-propylene copolymer and the like is usually used as a PTC matrix material. In this case, it is necessary to add an additional binder to the PTC matrix material and a conductive material. If the binder content is too small, the adhesion between coating and current collector will be poor. If the binder content is too large, it will affect the PTC effect performance such as response temperature and response speed. Fluorinated polyolefin and/or chlorinated polyolefin (such as PVDF) is a common binder. When used as a binder, the amount of PVDF is much less than the amount of the matrix material. For example, the PVDF binder in conventional PTC coatings is typically present in an amount of less than 15% or 10%, or even less, relative to the total weight of the coating. Some publications (such as CN105594019A, CN106558676A) also mention that PVDF itself may be used as a PTC matrix material, but most of them are purely speculative and have not actually verified the use of PVDF as a PTC matrix material. On the contrary, some other publications (such as CN104823313A on paragraph [0071]) explicitly recite that PVDF is not suitable for use as a PTC matrix material.

In the present application, fluorinated polyolefin and/or chlorinated polyolefin is used in the safety coating disposed between the current collector and the positive active material layer as a polymer matrix polymer, which still can function as a PTC thermistor layer. Based on the total weight of the safety coating, the weight percentage of fluorinated polyolefin and/or chlorinated polyolefin as the polymer matrix material is 35 wt % to 75 wt %, which is much higher than the amount of fluorinated polyolefin or chlorinated polyolefin (such as PVDF) usually used as a binder in the prior PTC thermistor layer.

In the present application, the fluorinated polyolefin and/or chlorinated polyolefin material actually serve as both a PTC matrix and a binder. In this way, it will avoid the influence on the adhesion of the coating, the response speed, and the response temperature of the PTC effect due to the difference between the binder and the PTC matrix material.

Secondly, the safety coating composed of fluorinated polyolefin and/or chlorinated polyolefin and a conductive material can function as a PTC thermistor layer, and its operating temperature range is suitable, which can be from 80° C. to 160° C. Thus the high temperature safety performance of the battery may be improved well.

Furthermore, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent (such as NMP or the like) in the electrode active material layer over the safety coating or the electrolyte may have an adverse effect such as dissolution, swelling and the like on the polymer material of the safety coating. For the safety coating containing PVDF in a binder amount, the adhesion would be easy to be worse. In the safety coating of the present application, the above adverse effect is ignorable since the content of fluorinated polyolefin and/or chlorinated polyolefin is higher.

In the electrode plate of the present application, based on the total weight of the safety coating, the weight percentage of fluorinated polyolefin and/or chlorinated polyolefin as the polymer matrix material is usually 35 wt % to 75 wt %. If the content is too small, the polymer matrix cannot ensure the safety coating works well in terms of its PTC effect; and if the content is too high, the content of the conductive material and the inorganic filler will be too low and thus will affect the response speed of the safety coating. The weight percentage of the fluorinated polyolefin and/or chlorinated polyolefin polymer matrix is preferably from 40 wt % to 75 wt %, more preferably from 50 wt % to 75 wt %.

In the present application, the safety coating disposed between the current collector and the positive active material layer further comprises a conductive material. The conductive material may be selected from at least one of a conductive carbon-based material, a conductive metal material, and a conductive polymer material, wherein the conductive carbon-based material may be selected from at least one of conductive carbon black, acetylene black, graphite, graphene, carbon nanotubes, carbon nanofibers; the conductive metal material may be selected from at least one of Al powder, Ni powder, and gold powder; and the conductive polymer material may be selected from at least one of conductive polythiophene, conductive polypyrrole, and conductive polyaniline. The conductive materials may be used alone or in combination of two or more.

The safety coating of the present application works as below. At normal temperature, the safety coating relies on a good conductive network formed between the conductive materials to conduct electron conduction; when the temperature rises, the volume of the polymer matrix materials begins to expand, the spacing between the particles of the conductive materials increases, and thus the conductive network is partially blocked, so that the resistance of the safety coating increases gradually. When a certain temperature (for example the operating temperature) is reached, the conductive network is almost completely blocked, and the current approaches zero, so that the electrochemical device with the safety coating is protected. Therefore, the amount of the conductive material is important to ensure that the PTC layer exerts its effect properly. In the present application, relative to the total weight of the safety coating, the weight percentage of the conductive material is from 5 wt % to 25 wt/o, preferably from 5 wt % to 15 wt/o.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

In the present application, the safety coating disposed between the current collector and the positive active material layer further comprises an inorganic filler. It has been found that in the case that the safety coating does not contain an inorganic filler, the solvent (such as NMP or the like) in the positive active material layer over the safety coating or the electrolyte may adversely dissolve and swell the polymer material in the safety coating, thereby damaging the safety coating and affecting its PTC effect. The inventors have found that after adding an inorganic filler to the safety coating, the inorganic filler serves as a barrier, which can advantageously eliminate the above-mentioned adverse effects such as dissolution and swelling, and thus it is advantageous for stabilizing the safety coating. In addition, it has also been found that the addition of the inorganic filler is also advantageous for ensuring that the safety coating is not easily deformed during compaction process of the electrode plate. Therefore, the addition of the inorganic filler can well ensure that the safety coating is stably disposed between the current collector and the positive active material layer, and the current collector is prevented from directly contacting the positive active material layer, thereby improving safety performance of the battery.

The inventors have also unexpectedly discovered that inorganic fillers can also improve the performances such as the response speed of the safety coating. The safety coating works as below. At normal temperature, the safety coating relies on a good conductive network formed between the conductive materials to conduct electron conduction; when the temperature rises, the volume of the polymer matrix materials begins to expand, the spacing between the particles of the conductive materials increases, and thus the conductive network is partially blocked, so that the resistance of the safety coating increases gradually; when a certain temperature (for example the operating temperature) is reached, the conductive network is almost completely blocked, and the current approaches zero. However, usually the conductive network would be partially recovered, when the inside of the safety coating reaches a dynamic balance. Therefore, after reaching a certain temperature (for example, the operating temperature), the resistance of the safety coating is not as large as expected, and still there is very little current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can display PTC effect in the operating temperature range better, which means that at a high temperature the increasing speed of resistance is faster and the PTC response speed is faster. Thus, the safety performance of battery can be improved better.

The inorganic filler is present in a weight percentage of 10 wt % to 60 wt % based on the total weight of the safety coating. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

The inorganic filler may stabilize the safety coating from the following two aspects: (1) to hinder solvents (such as NMP, etc.) in the positive electrode active material layer or electrolyte from dissolving or swelling the polymer material in the safety coating; and (2) to ensure that the safety coating is not easily deformed during compaction process of the electrode plate.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the inorganic filler may be selected from at least one of magnesium oxide, alumina, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, and lithium titanate, or at least one of a conductive carbon coating modified above material, a conductive metal coating modified above material or a conductive polymer coating modified above material.

As a further improvement of the present application, it is particularly advantageous when a positive electrochemically active material (hereinafter abbreviated as an electrochemically active material) is used as an inorganic filler in the case that the safety coating is used for a positive electrode plate.

The inventors have found that it is particularly advantageous when an electrochemically active material is used as an inorganic filler. In such a case, in addition to above mentioned function as stabilizing the safety coating layer (hindering organic solvent from dissolving or swelling the polymer material of the safety coating layer and ensuring that the safety coating layer is not easily deformed) and improving the performance such as the response speed and the like of the safety coating, the positive electrochemically active material used as the inorganic filler may further play the following two roles: (1) To improve the overcharge performance of the battery. In the PTC safety coating system composed of a fluorinated polyolefin and/or chlorinated polyolefin polymer matrix and a conductive material, since the electrochemically active material has the characteristics of lithium ion intercalation/de-intercalation, the electrochemically active material can be used as an "active site" in the conductive network at the normal operating temperature of the battery and thus the number of "active site" in the safety coating is increased. In the process of overcharging, the electrochemically active material will delithiate and the de-lithiating process would become more and more difficult, thus the impedance is increasing gradually. As a result, when the current passes, the heat-generating power increases, and the temperature of the primer layer increases faster, so the PTC effect responds faster, which in turn can display PTC effects before the safety problem occurs when battery is overcharged. Thus the battery overcharge safety performance may be improved. (2) To contribute charge and discharge capacity. Since the electrochemically active material can contribute a certain charge and discharge capacity at the normal operating temperature of the battery, therefore, the impact of the safety coating on the electrochemical performance such as capacity of the battery at the normal operating temperature can be minimized.

The especially preferred positive electrochemically active material suitable for above use is selected from at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganese oxide, spinel lithium nickel manganese oxide, and lithium titanate.

In addition, the inventors have found that when the positive electrochemical active material is used as a filler, the conductivity of the filler is improved, which will further improve the performance of the entire electrode plate mainly due to the following reasons: the increase in conductivity can reduce the internal resistance of battery, and further reduce the increase in battery internal resistance due to the safety coating, thereby improving the battery cycle life and other electrochemical performance. Those skilled in the art can understand that the conductive performance of inorganic filler can be improved by material modification or modification means commonly used in the art, for example, coating the inorganic filler with a conductive carbon, a conductive metal, or a conductive polymer.

Therefore, in the safety coating of the present application, either an unmodified electrochemically active material can be used, or an electrochemically active material modified with a conductive carbon coating, a conductive metal coating, or a conductive polymer coating can be used. However, it is preferred to use a positive electrochemically active material modified with a conductive carbon coating, a conductive metal coating, or a conductive polymer coating as an inorganic filler.

In some embodiments of the present application, the inorganic filler in the present safety coating is preferably a conductive carbon coating modified electrochemically active materials, such as at least one of conductive carbon coating modified lithium cobalt oxide, conductive carbon coating modified lithium nickel manganese cobalt oxide, conductive carbon coating modified lithium nickel manganese aluminum oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These conductive carbon coating modified electrochemically active materials are commonly used materials in the manufacture of lithium batteries, most of which are commercially available directly. The type of conductive carbon may be graphite, graphene, conductive carbon black, carbon nanotubes or the like. Further, the conductivity of the inorganic filler can be adjusted by adjusting the content of the conductive carbon coating.

Further preferably, in the carbon coating modified positive electrode electrochemically active material, the weight percentage of carbon is from 0.5 wt % to 5 wt % based on the weight of the carbon coating modified positive electrochemically active material. If the content of carbon coating is too small, it will not play a role in significantly improving conductivity; if the content is too large, it will affect the PTC safety coating to display PTC effect normally.

In addition to the polymer matrix, the conductive material, and the inorganic filler, the safety coating may also comprise other materials or components, such as binders that promote adhesion between the coating and the substrate for current collector, additives that may improve processing performance of electrode plate. Those skilled in the art can select other auxiliaries according to actual needs.

Since the polymer matrix material used in the present application itself has a good adhesion, in some embodiments of the present application, the safety coating layer is substantially free of other binders other than the matrix material (in which the phrase "substantially free" means≤3%, ≤1%, or ≤0.5%). In some embodiments of the present application, the safety coating is substantially free of water-based binders (such as CMC, polyacrylate, polycarbonate, polyethylene oxide, rubber, polyurethane, sodium carboxymethyl cellulose, polyacrylic acid, acrylonitrile copolymer with other monomers, gelatin, chitosan, sodium alginate, a coupling agent, cyanoacrylate, polymeric cyclic ether derivatives, hydroxy derivatives of cyclodextrin, and the like).

Moreover, in some embodiments of the present application, the safety coating of the present application may consist essentially of the polymer matrix, the conductive material, and the inorganic filler, which is free of a significant amounts (e.g., ≤3%, ≤1%, or ≤0.5%) of other components.

Those skilled in the art will appreciate that various definition or preferred ranges of the component selection, component content, and material physicochemical properties of the safety coating in the various embodiments of the present application mentioned above can be combined arbitrarily. The combined embodiments are still within the scope of the application and are considered as part of the disclosure.

In the present application, the coating thickness H of the safety coating is not more than 40 μm, preferably not more than 25 μm, more preferably not more than 20 μm, 15 μm or 10 μm. The coating thickness of the safety coating is greater than or equal to 1 μm, preferably greater than or equal to 2 μm, and more preferably greater than or equal to 3 μm. If the thickness is too small, it is not enough to ensure that the safety coating improves the safety performance of the battery; if it is too large, the internal resistance of the battery will increase seriously, which will affect the electrochemical performance of the battery during normal operation.

In the positive electrode plate of the present application, the safety coating is disposed on a positive current collector. For the current collector, the common materials in the art, such as metal flakes or metal foils of stainless steel, aluminum, copper, titanium or the like can be used.

In the positive electrode plate of the present application, a positive active material layer is provided over the safety coating.

The positive active material layer used in the present application may be selected from various positive active material layers suitable for a lithium ion battery in the art, and the constitution and preparation thereof are well known in the art. The positive active material layer contains a positive active material, and various positive electrode active materials for preparing a lithium ion secondary battery positive electrode known to those skilled in the art may be used. For example, the positive electrode active material is a lithium-containing composite metal oxide, and its specific examples comprise $LiCoO_2$, $LiNiO_2$, $LiMn_2O_4$, $LiFePO_4$, and one or more of lithium nickel cobalt manganese oxides (such as $LiNi_{0.5}Co_{0.2}Mn_{0.3}O_2$) and one or more of lithium nickel manganese oxides.

The negative electrode plate for use in conjunction with the positive electrode plate of the present application may be various negative electrode plates commonly used in lithium batteries. The negative active material layer of the negative electrode plate can be selected from various negative electrode active material layers known in the art that are suitable for use in lithium batteries, the constitution and preparation of which are well known in the art. The negative active material layer comprises a negative active material, which may be various negative active materials known in the art that may be used for the preparation of lithium ion secondary batteries, for example, a carbonaceous material such as graphite (artificial graphite or natural graphite), conductive carbon black, carbon fiber, or the like, a metal or a semimetal material such as Si, Sn, Ge, Bi, Sn, In, or an alloy thereof, and a lithium-containing nitride or a lithium-containing oxide, a lithium metal or a lithium aluminum alloy.

It should be noted that the positive electrochemically active material in the safety coating and the positive active material in the positive active material layer may be the same or different.

The present application also discloses an electrochemical device, comprising the positive electrode plate according to the present application. The electrochemical device may be a capacitor, a primary battery or a secondary battery, for example a lithium-ion capacitor, a lithium-ion battery or a sodium-ion battery. In addition to the use of the positive electrode plate as described above, the construction and preparation methods of these electrochemical devices are known per se. Due to the use of the positive electrode plate as described above, the electrochemical device can have improved safety and electrical performances such as cycle performance. Furthermore, the positive electrode plate according to this application can be easily processed, so that the manufacturing cost of the electrochemical device can be reduced by using the positive electrode plate according to the present application.

EXAMPLES

In order to make the objects, the technical solutions and the beneficial technical effects of the present application more clear, the present application will be described in further detail below with reference to the embodiments. However, it is to be understood that embodiments of the present application are only intended to be illustrative of the present application, and are not intended to limit the invention, and embodiments of the present application are not limited to those embodiments given in the specification. The experimental conditions not indicated in the examples may refer to conventional conditions, or the conditions recommended by the material supplier or equipment supplier.

1. Preparation Method 1.1 Preparation of Safety Coating

A certain ratio of a polymer matrix material, a conductive material, and an inorganic filler were mixed with N-methyl-2-pyrrolidone (NMP) as a solvent with stirring uniformly, which was then coated on a current collector such as a positive current collector Al foil or a negative current collector Cu foil, followed by drying to obtain a PTC layer, i.e. a safety coating.

The main materials used in the safety coating of specific examples were as follows:

Polymer matrix: PVDF, PVDC;

Conductive material (conductive agent): Super-P (TIMCAL, Switzerland, abbreviated as SP);

Inorganic filler lithium iron phosphate (abbreviated as LFP), carbon coating modified lithium iron phosphate (abbreviated as LFP/C), lithium cobalt oxide (abbreviated as LCO), carbon coating modified lithium cobalt oxide (abbreviated as LCO/C), lithium titanate (abbreviated as $Li_4Ti_5O_{12}$), carbon coating modified lithium titanate (abbreviated as $Li_4Ti_5O_{12}$/C) and alumina.

The above materials were commonly used materials in the lithium battery industry which may be commercially available from the corresponding suppliers.

1.2 Preparation of Positive Electrode Plate

Positive electrode plate with a safety coating was prepared as follows: 90 wt % of a ternary material NCM811 ($LiNi_{0.8}Co_{0.1}Mn_{0.1}O_2$), 5 wt % of SP and 5 wt % of PVDF were added to NMP as a solvent to form a cathode slurry; then the slurry was coated on the safety coating on the surface of the positive electrode current collector in the form of aluminum foil as prepared according to the method as described in "1.1 Preparation of safety coating" as a positive active material layer, and dried at 85° C., then trimmed, cut, and stripped, followed by drying under vacuum at 85° C. for 4 hours. After welding, the positive electrode plate meeting the requirements of the secondary battery was obtained.

Conventional positive electrode plate (abbreviated as CPlate P) was prepared as follows: with the same preparation described as above, but no safety coating was disposed on the surface of the positive electrode current collector in the form of aluminum foil.

1.3 Preparation of Negative Electrode Plate

Conventional negative electrode plate (abbreviated as CPlate N) was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.4 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1M to prepare an electrolyte.

1.5 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "1.4 Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0 V with a constant current of 0.1 C. Above charging and discharging processes were repeated twice. Finally, the battery core was charged to 3.8 V with a constant current of 0.1 C, thereby completing the preparation of the secondary battery.

2. Test for Battery Performance

The safety performances of the secondary batteries from various examples and comparative examples were evaluated using GBT31485-2015 "Safety Requirements and Test Methods for Traction Battery of Electric Vehicle", and the test results were recorded.

2.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/sin the direction perpendicular to the battery plate. The puncture position should be close to the geometric center of the surface to be punctured, the steel needle stayed in the battery, and then observe if the battery had an indication of burning or exploding.

2.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging with a constant current of 1 C for 1 hour, the charging was terminated.

2.3 Cycle Performance Test:

The test conditions for the cycle performance test were as follows: the secondary battery was subjected to a 1 C/1 C cycle test at 25° C. in which the charging and discharging voltage range was 2.8 V to 4.2 V. The test was terminated when the capacity was attenuated to 80% of the first discharging specific capacity.

2.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3. Performance Test Results 3.1 Protection Performance (PTC Effect) of Safety Coating and Effect Thereof on Battery Performance In order to confirm the protection performance of the present application, the corresponding safety coating, positive electrode plate, negative electrode plate and battery were prepared with the specific materials and amounts listed in Table 1-1 below according to the methods and procedures described in "1. Preparation method", and were tested according to the method specified in "2. Tests for battery performance". In order to ensure accuracy of data, 4 samples were prepared for each battery (10 samples for the puncture test) and tested independently. The final test results were averaged and shown in Table 1-2 and Table 1-3.

TABLE 1-1

Compositions of electrode plate

| | | | Composition of the safety coating | | | | | | Thickness of safety coating H (μm) |
|---|---|---|---|---|---|---|---|---|---|
| | Electrode plate | Electrode active material | Polymer material | | Conductive material | | Inorganic filler | | |
| | | | Material | wt % | Material | wt % | Material | wt % | |
| CPlate P | Positive | NCM811 | / | / | / | / | / | / | / |
| CPlate N | Negative | graphite | / | / | / | / | / | / | / |
| Comp. Plate CP | Positive | NCM811 | PVDF | 90 | SP | 10 | / | / | 20 |
| Plate 1 | Positive | NCM811 | PVDC | 35 | SP | 10 | alumina | 55 | 10 |
| Plate 2 | Positive | NCM811 | PVDF | 35 | SP | 10 | LFP | 55 | 3 |

TABLE 1-2

Performances of lithium-ion batteries

| Battery No. | Positive electrode plate | Negative electrode plate | Puncture test |
|---|---|---|---|
| Battery 1 | CPlate P | CPlate N | 0 pass, 10 no pass |
| Battery 2 | Comp. Plate CP | CPlate N | 2 pass, 8 no pass |
| Battery 3 | Plate 1 | CPlate N | 10 pass |
| Battery 4 | Plate 2 | CPlate N | 10 pass |

TABLE 1-3

Performances of lithium-ion batteries

| Battery No. | Positive electrode plate | Negative electrode plate | Growth rate of DCR (130° C., 1 h) | Growth rate of DCR (130° C., 2 h) |
|---|---|---|---|---|
| Battery 2 | Comp. Plate CP | CPlate N | 20% | 30% |
| Battery 4 | Plate 2 | CPlate N | 1200% | 1500% |

The data in Table 1-1, Table 1-2 and Table 1-3 indicated that the present positive electrode plate significantly improved the safety performance of the battery during nail penetration, and the addition of the inorganic filler significantly improved the direct current resistance (DCR) growth of the battery at a high temperature, thereby improving percent of pass in the Puncture Test.

3.2 Effect of the Content of Each Component Contained in the Safety Coating

In order to further study the effect of the content of each component contained in the safety coating, the corresponding safety coating, positive electrode plate, negative electrode plate and battery were prepared with the specific materials and amounts listed in Table 2-1 below according to the methods and procedures described in "1. Preparation method", and then were tested according to the method specified in "2. Test for battery performance". In order to ensure the accuracy of data, 4 samples were prepared for each battery (10 samples for the puncture test or overcharge test) and tested independently. The final test results were averaged and shown in Table 2-2.

will not exert its PTC effect sufficiently, so safety performance of the battery cannot be fully improved; if the content of the inorganic filler is too high, the content of the polymer matrix is too low, so that the safety coating cannot properly exert its PTC effect; (2) the conductive material has a great influence on the internal resistance and polarization of the battery, so it would affect the cycle life of the battery. The higher the content of the conductive material is, the smaller the internal resistance and polarization of the battery would be, so that the cycle life will be better.

It had been found through experiments that the appropriate content range of each component in the safety coating was as follows:

the weight percentage of the polymer matrix was from 35 wt % to 75 wt %;

the weight percentage of the conductive material was from 5 wt % to 25 wt %;

the weight percentage of the inorganic filler was from 10 wt % to 60 wt %.

TABLE 2-1

Compositions of electrode plate

| | | Composition of the safety coating | | | | | | Thickness of safety coating H ($\mu$m) |
|---|---|---|---|---|---|---|---|---|
| Electrode plate | Electrode active material | Polymer matrix Material | wt % | Conductive material Material | wt % | Inorganic filler Material | wt % | |
| Comp. Plate2-1 | Positive | NCM811 | PVDF | 75 | SP | 20 | alumina | 5 | 8 |
| Plate2-2 | Positive | NCM811 | PVDF | 75 | SP | 15 | alumina | 10 | 8 |
| Plate2-3 | Positive | NCM811 | PVDF | 75 | SP | 10 | alumina | 15 | 8 |
| Plate2-4 | Positive | NCM811 | PVDF | 60 | SP | 10 | alumina | 30 | 8 |
| Plate2-5 | Positive | NCM811 | PVDF | 60 | SP | 8 | alumina | 32 | 8 |
| Plate2-6 | Positive | NCM811 | PVDF | 55 | SP | 15 | alumina | 30 | 8 |
| Plate2-7 | Positive | NCM811 | PVDF | 50 | SP | 25 | alumina | 25 | 8 |
| Plate2-8 | Positive | NCM811 | PVDF | 40 | SP | 15 | alumina | 45 | 8 |
| Plate2-9 | Positive | NCM811 | PVDF | 35 | SP | 5 | alumina | 60 | 8 |
| Comp. Plate2-10 | Positive | NCM811 | PVDF | 25 | SP | 5 | alumina | 70 | 8 |

TABLE 2-2

Performance of lithium-ion batteries

| Battery | Positive electrode | Negative electrode | Puncture test | Cycle life (cycle) |
|---|---|---|---|---|
| Battery 6 | Comp. Plate 2-1 | CPlate N | 5 pass, 5 no pass | 2502 |
| Battery 7 | Plate 2-2 | Cplate N | 10 pass | 2351 |
| Battery 8 | Plate 2-3 | Cplate N | 10 pass | 2205 |
| Battery 9 | Plate 2-4 | Cplate N | 10 pass | 2251 |
| Battery 10 | Plate 2-5 | Cplate N | 10 pass | 2000 |
| Battery 11 | Plate 2-6 | Cplate N | 10 pass | 2408 |
| Battery 12 | Plate 2-7 | Cplate N | 10 pass | 2707 |
| Battery 13 | Plate 2-8 | Cplate N | 10 pass | 2355 |
| Battery 14 | Plate 2-9 | Cplate N | 10 pass | 1800 |
| Battery 15 | Comp. Plate 2-10 | Cplate N | 4 no pass, 6 pass | 1715 |

The data in Table 2-1 and Table 2-2 show that: (1) If the content of the inorganic filler is too low, the safety coating 3.3 Effect of the Kind of the Inorganic Filler on Battery Performance In order to further study the effect of materials in the safety coating on performances of the electrode plate and the battery, the corresponding safety coating, positive electrode plate, negative electrode plate and battery were prepared with the specific materials and amounts listed in Table 3-1 below according to the methods and procedures described in "1. Preparation method", and were tested according to the method specified in "2. Test for battery performance". In order to ensure accuracy of data, 4 samples were prepared for each battery (10 samples for the puncture test or overcharge test) and tested independently. The final test results were averaged which were shown in Table 3-2.

TABLE 3-1

Compositions of electrode plate

| | | | Composition of the safety coating | | | | | | |
|---|---|---|---|---|---|---|---|---|---|
| Electrode plate | Electrode active material | Polymer matrix | | Conductive material | | Inorganic filler | | Carbon content | Thickness of safety coating H (μm) |
| | | Material | wt % | Material | wt % | Material | wt % | | |
| Comp. Plate2-11 | Positive | NCM811 | PVDF | 60 | SP | 10 | alumina | 30 | / | 8 |
| Comp. Plate2-12 | Positive | NCM811 | PVDF | 60 | SP | 10 | LFP | 30 | / | 8 |
| Plate2-13 | Positive | NCM811 | PVDF | 60 | SP | 10 | LFP/C | 30 | 1 | 8 |
| Plate2-14 | Positive | NCM811 | PVDF | 60 | SP | 10 | LFP/C | 30 | 2 | 8 |
| Plate2-15 | Positive | NCM811 | PVDF | 60 | SP | 10 | LFP/C | 30 | 3 | 8 |
| Plate2-16 | Positive | NCM811 | PVDF | 60 | SP | 10 | $Li_4Ti_5O_{12}$/C | 30 | 5 | 8 |

TABLE 3-2

Performances of lithium-ion batteries

| Battery | Positive electrode | Negative electrode | Puncture test | Overcharge test | Cycle test (cycle) |
|---|---|---|---|---|---|
| Battery 16 | Comp. Plate2-11 | CPlate N | 10 pass | 0 pass, 10 no pass | 2200 |
| Battery 17 | Comp. Plate2-12 | CPlate N | 10 pass | 10 pass | 2300 |
| Battery 18 | Plate2-13 | CPlate N | 10 pass | 10 pass | 2500 |
| Battery 19 | Plate2-14 | CPlate N | 10 pass | 10 pass | 2700 |
| Battery 20 | Plate2-15 | CPlate N | 10 pass | 10 pass | 2900 |
| Battery 21 | Plate2-16 | CPlate N | 10 pass | 10 pass | 3000 |

The data in Tables 3-1 and 3-2 showed that compared to other materials (such as alumina), the electrochemically active material significantly improved the overcharge safety performance of the battery. In addition, carbon coating modified electrochemically active material further improved the cycle life of the battery.

It will be understood by those skilled in the art that the above application examples of the safety coating of the present application are only exemplified to be used for a lithium battery, but the safety coating of the present application can also be applied to other types of batteries or electrochemical devices, and still may produce good technical effect of the present application.

It will be apparent to those skilled in the art that the present application may be modified and varied in accordance with the above teachings. Accordingly, the present application is not limited to the specific embodiments disclosed and described above, and some modifications and variations of the present application are intended to be included within the scope of the claims of the present application. In addition, although some specific terminology is used in this specification, these terms are for convenience of illustration only and are not intended to limit the present application in any way.

The invention claimed is:

1. A positive electrode plate, comprising a current collector, a positive active material layer and a safety coating disposed between the current collector and the positive active material layer, the safety coating comprising a polymer matrix, a conductive material and an inorganic filler,
    wherein the polymer matrix is fluorinated polyolefin and/or chlorinated polyolefin;
    wherein based on the total weight of the safety coating,
        a weight percentage of the polymer matrix is from 35 wt % to 75 wt %,
        a weight percentage of the conductive material is from 5 wt % to 25 wt %, and
        a weight percentage of the inorganic filler is from 10 wt % to 60 wt %; and
    wherein the inorganic filler is a carbon coating modified positive electrochemically active material.

2. The positive electrode plate as claimed in claim 1, wherein the polymer matrix is at least one selected from polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymer, or PVDC copolymer.

3. The positive electrode plate as claimed in claim 1, wherein the conductive material is at least one selected from a conductive carbon-based material, a conductive metal material, or a conductive polymer material.

4. The positive electrode plate as claimed in claim 1, wherein the inorganic filler is at least one selected from a conductive carbon coating modified lithium cobalt oxide, a conductive carbon coating modified lithium nickel manganese cobalt oxide, a conductive carbon coating modified lithium nickel manganese aluminum oxide, a conductive carbon coating modified lithium iron phosphate, a conductive carbon coating modified lithium vanadium phosphate, a conductive carbon coating modified lithium cobalt phosphate, a conductive carbon coating modified lithium manganese phosphate, a conductive carbon coating modified lithium iron silicate, a conductive carbon coating modified lithium vanadium silicate, a conductive carbon coating modified lithium cobalt silicate, a conductive carbon coating modified lithium manganese silicate, a conductive carbon coating modified spinel lithium manganese oxide, a conductive carbon coating modified spinel lithium nickel manganese oxide, or a conductive carbon coating modified lithium titanate.

5. The positive electrode plate as claimed in claim 1, wherein the safety coating has a thickness H of 1 μm≤H≤20 μm.

6. The positive electrode plate as claimed in claim 1, wherein in the carbon coating modified positive electrochemically active material, the weight percentage of carbon is from 0.5 wt % to 5 wt % based on the weight of the carbon coating modified positive electrochemically active material.

7. The positive electrode plate as claimed in claim 1, wherein based on the total weight of the safety coating, the weight percentage of the polymer matrix is from 50 wt % to 75 wt %, the weight percentage of the conductive material is from 5 wt % to 15 wt %, and the weight percentage of the inorganic filler is from 15 wt % to 45 wt %.

8. An electrochemical device, comprising the positive electrode plate as claimed in claim 1, which is a capacitor, a primary battery or a secondary battery.

9. A safety coating for a positive electrode plate, comprising a polymer matrix, a conductive material and an inorganic filler,
wherein the polymer matrix is a fluorinated polyolefin and/or chlorinated polyolefin polymer matrix;
wherein based on the total weight of the safety coating,
a weight percentage of the polymer matrix is from 35 wt % to 75 wt %,
a weight percentage of the conductive material is from 5 wt % to 25 wt %, and
a weight percentage of the inorganic filler is from 10 wt % to 60 wt %; and
wherein the inorganic filler is a carbon coating modified positive electrochemically active material.

10. The safety coating as claimed in claim 9, wherein based on the total weight of the safety coating, the weight percentage of the polymer matrix is from 50 wt % to 75 wt %, the weight percentage of the conductive material is from 5 wt % to 15 wt %, and the weight percentage of the inorganic filler is from 15 wt % to 45 wt %.

11. The positive electrode plate as claimed in claim 3, wherein the conductive carbon-based material is selected from at least one of conductive carbon black, acetylene black, graphite, graphene, carbon nanotubes, carbon nanofibers.

12. The positive electrode plate as claimed in claim 3, wherein the conductive metal material is at least one selected from Al powder, Ni powder, or gold powder.

13. The positive electrode plate as claimed in claim 3, wherein the conductive polymer material is at least one selected from conductive polythiophene, conductive polypyrrole, or conductive polyaniline.

14. The positive electrode plate as claimed in claim 1, wherein the safety coating has a thickness H of 3 µm≤H≤10 µm.

15. The positive electrode plate as claimed in claim 2, wherein in the carbon coating modified positive electrochemically active material, the weight percentage of carbon is from 0.5 wt % to 5 wt % based on the weight of the carbon coating modified positive electrochemically active material.

16. The positive electrode plate as claimed in claim 3, wherein in the carbon coating modified positive electrochemically active material, the weight percentage of carbon is from 0.5 wt % to 5 wt % based on the weight of the carbon coating modified positive electrochemically active material.

17. The positive electrode plate as claimed in claim 4, wherein in the carbon coating modified positive electrochemically active material, the weight percentage of carbon is from 0.5 wt % to 5 wt % based on the weight of the carbon coating modified positive electrochemically active material.

* * * * *